Oct. 14, 1947.  J. J. BLOOMFIELD  2,429,119
POWER TRANSMISSION
Filed Aug. 16, 1943  2 Sheets-Sheet 1
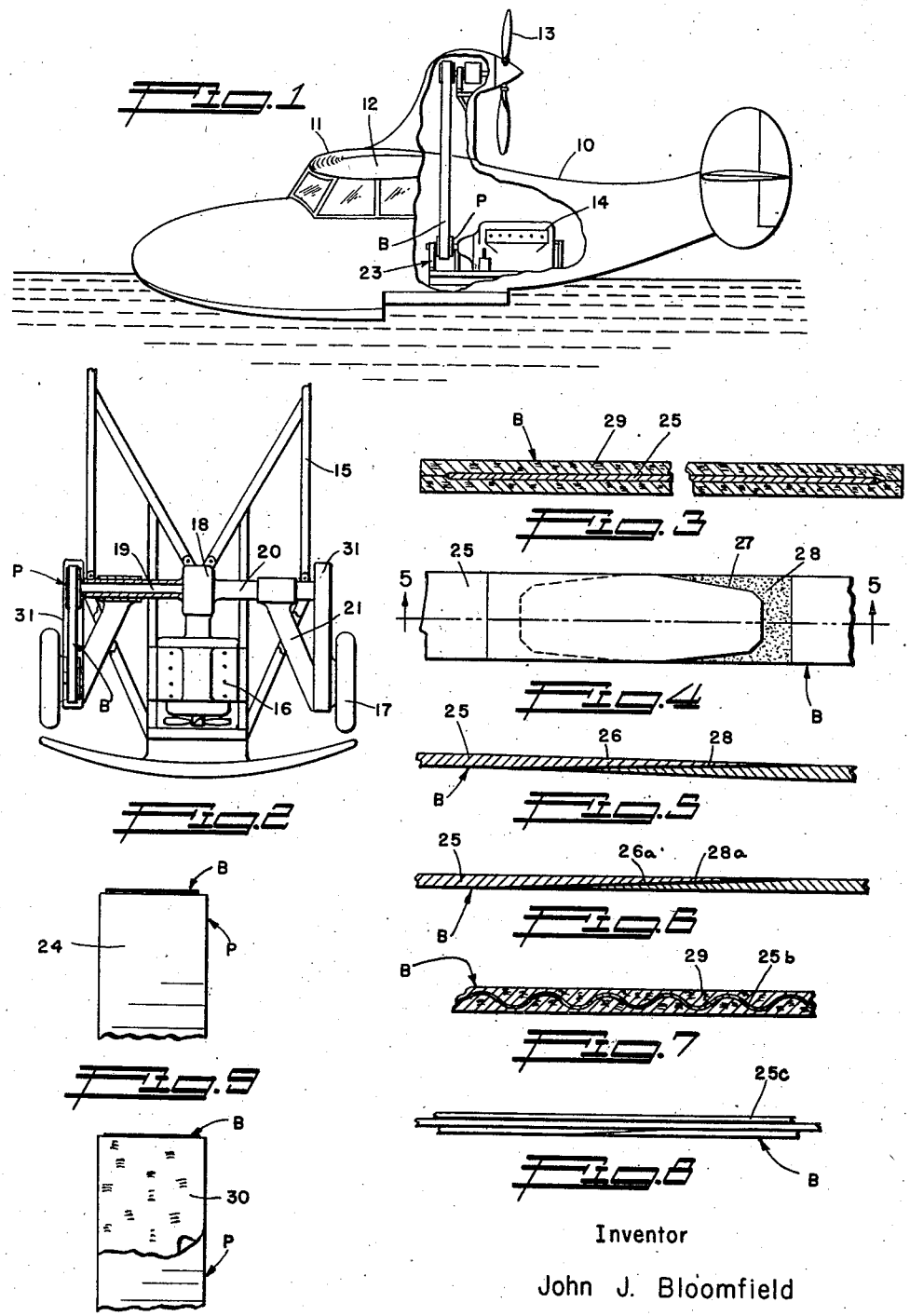
Inventor
John J. Bloomfield
By George C. Sullivan
Agent Oct. 14, 1947. J. J. BLOOMFIELD 2,429,119
POWER TRANSMISSION
Filed Aug. 16, 1943 2 Sheets-Sheet 2
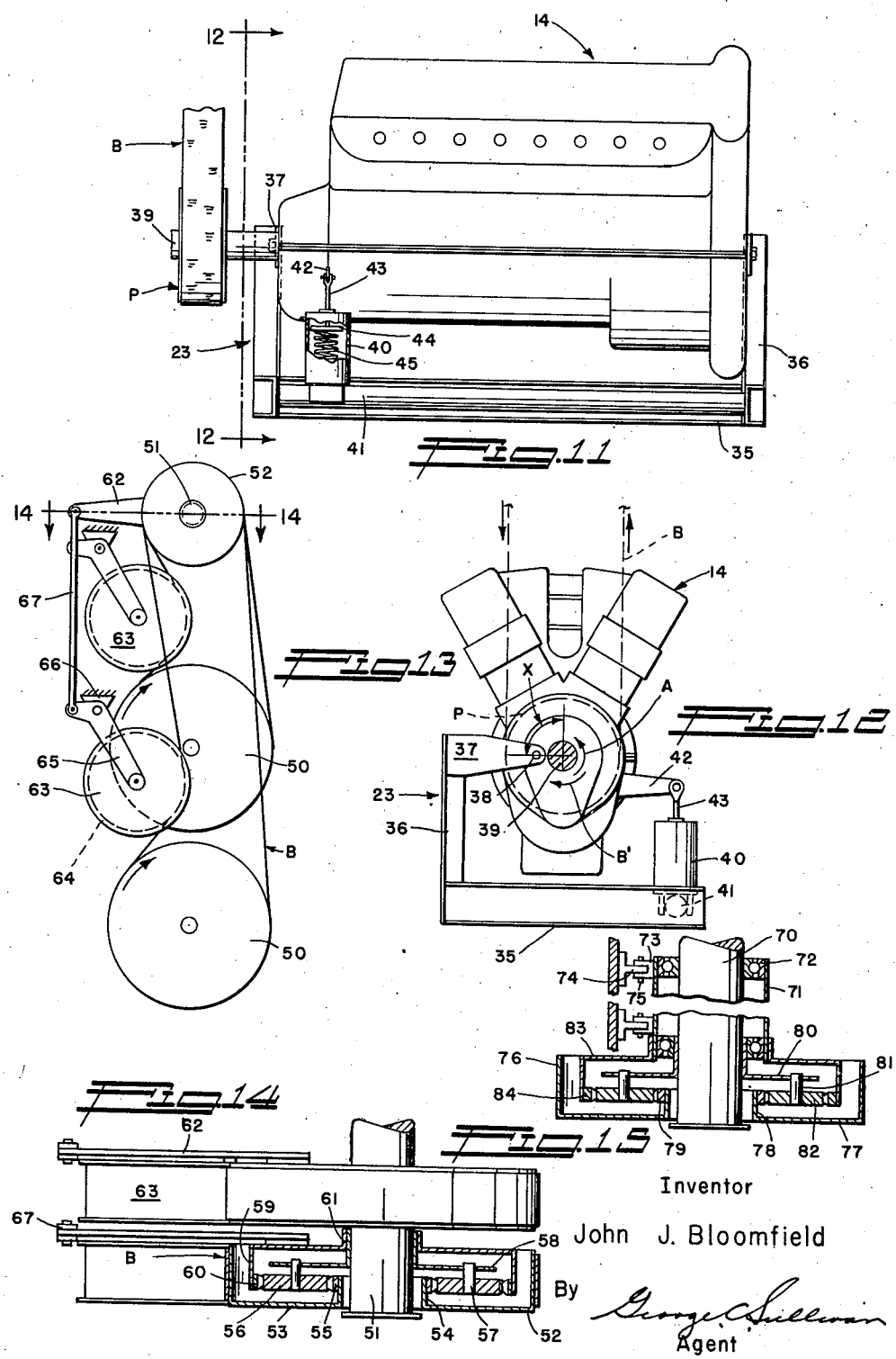
Inventor
John J. Bloomfield
By George C. Sullivan
Agent Patented Oct. 14, 1947

2,429,119

UNITED STATES PATENT OFFICE 2,429,119

POWER TRANSMISSION

John J. Bloomfield, Burbank, Calif., assignor, by mesne assignments, to Lockheed Aircraft Corporation, a corporation of California Application August 16, 1943, Serial No. 498,773

3 Claims. (Cl. 74—232)

This invention relates to power transmissions and relates more particularly to power transmissions of the belt and pulley class. It is a general object of this invention to provide a practical and particularly effective belt and pulley power transmission system.

Belt and pulley drives have a wide range of application where the driving and driven elements are spaced substantial distances apart. The field of usefulness of belt and pulley drives has been limited, however, to installations where the size and weight of the parts are not controlling factors and where high speeds are not encountered. The conventional leather belts, fabric belts, rubber belts, etc., may be designed to transmit substantial power where large heavy pulleys are employed, but are not suitable in high speeds, high power transmissions or in transmissions where weight is a factor. For example, it is often desirable to locate the power plants of aircraft at points remote from the propellers, but the belt and pulley drives utilizing leather belts or fabric belts are wholly unsuited for such installations. Other examples of instrumentalities where belt and pulley drives would be highly desirable except for their present limitations, are automotive land vehicles and centrifuges.

Power transmitting belts as heretofore constructed have definitely restricted the field of usefulness of belt and pulley transmissions. A power transmitting belt must have a high degree of flexibility in order to properly operate over the pulleys, and it has been the almost universal practice to construct the belts of leather, fabric, rubber or combinations of such materials to obtain the required flexibility. Materials of that nature have a relatively low tensile strength and where substantial power is to be transmitted, the belt must be thick and wide, necessitating heavy pulleys. A thick heavy belt cannot be successfully operated at high peripheral speeds due to inertia effects, and a belt of leather, fabric or rubber cannot be employed in a high speed drive transmitting any substantial power due to such effects and the tendency of the belt to stretch excessively when subjected to heavy tension.

An important object of this invention is to provide an extremely light weight power transmitting means capable of transmitting substantial power.

Another object of this invention is to provide a transmission embodying a belt which is very light in weight and yet capable of transmitting substantial power. In a typical application of the invention, a lineal foot of the belt may weigh as little as with the belt operable to transmit, in regular operation, as much as 300 horsepower.

Another object of the invention is to provide a power transmission in which the belt comprises an extremely thin endless ribbon of steel, or the like, having a high tensile strength. The power-transmitting metal ribbon may have a cross sectional area of between .004 and .012 square inch in situations where the belt is to transmit power ranging from 100 to 300 horsepower. The extreme thinness of the steel belt element reduces the operational stresses, due to centrifugal forces, to a minimum and allows the belt to be operated at high linear velocities.

Another object of the invention is to provide a belt for use in a power transmission characterized by a thin ribbon of steel, or the like, whose ends are connected by a joint having a tensile strength at least as great as that of the ribbon itself, said joint being formed or constructed without appreciably reducing the original resiliency, flexibility and tensile strength of the metal of which the ribbon is formed. In prior attempts to construct power-transmitting belts of a thin metal ribbon the end portions of the ribbon were connected by rivets or screws which would clearly be useless or impractical in a belt where the thickness of the metal ribbon is in the order of .006 inch and in other cases, the ends of the ribbon were connected by brazing, soldering or welding. Brazing, soldering and welding subject the metal of the ribbon to damaging temperatures, thus weakening the ribbon at the joint. The joint of the present invention may be made without subjecting the metal to high temperatures, and the joint when completed, has a tensile strength comparable with or greater than the body of the ribbon itself.

Another object of this invention is to provide a belt of the character referred to embodying friction material which provides the required frictional engagement between the belt and pulleys and which protects the metal ribbon against abrasion and corrosion.

Another object of this invention is to provide a power transmitting drive of the general character referred to embodying a highly effective means for automatically maintaining the belt under a tension proportionate to the power being transmitted, which means automatically regulates the tension on the belt as the power load varies to maintain the drive in its most efficient state at all times. In the device of the invention, torque reaction is utilized to automatically vary the tension upon the belt and thus maintain optimum performance.

Other objects and features will be readily understood from the following detailed description of typical embodiments and applications of the invention throughout which description reference is made to the accompanying drawings in which, Figure 1 is a side view of a typical aircraft of the flying boat class with a portion broken away to illustrate a typical drive or transmission of the invention;

Figure 2 is a fragmentary plan view of a portion of an automotive vehicle illustrating another application of the invention with certain parts appearing in horizontal cross section;

Figure 3 is a greatly enlarged transverse cross sectional view of one form of belt provided by the invention with the intermediate portion broken away;

Figure 4 is a fragmentary plan view of the metal ribbon of the belt illustrating the joint in the ribbon;

Figure 5 is a greatly enlarged longitudinal sectional view of the joint taken as indicated by line 5—5 on Figure 4;

Figure 6 is a view similar to Figure 5 illustrating a slightly modified form of joint;

Figure 7 is a greatly enlarged fragmentary longitudinal sectional view of another form of belt of the invention;

Figure 8 is a greatly enlarged fragmentary side or edge view of still another form of belt of the invention;

Figure 9 is a fragmentary view of a pulley of the transmission showing the belt in vertical cross section;

Figure 10 is a view similar to Figure 9 showing friction material on the pulley;

Figure 11 is an enlarged side elevation of an engine supported by the automatic belt tensioning or conditioning means of the invention with a portion of the dashpot broken away;

Figure 12 is a view taken as indicated by line 12—12 on Figure 11 showing the engine and the suspension means in front elevation;

Figure 13 is a more or less diagrammatical end elevation of a transmission embodying another form of belt tensioning means;

Figure 14 is an enlarged horizontal, detailed, sectional view taken as indicated by line 14—14 on Figure 13 with a portion appearing in elevation, and Figure 15 is a view similar to Figure 14 illustrating still another form of belt tensioning means.

The power transmission of the invention and its several elements are useful in numerous situations where power is to be transmitted mechanically. The invention is well suited for use in aircraft and in Figure 1 of the drawings I have illustrated the invention incorporated in a typical aircraft. In Figure 2 of the drawings, I have shown the invention embodied in an automotive land vehicle. It is to be understood that the applications herein disclosed are merely illustrative and are not to be construed as limiting the scope of application of the invention.

The typical aircraft illustrated in Figure 1 has the usual fuselage 10, cabin 11, wings 12, etc. A propeller 13 is supported above the cabin 11 to be clear of the water and spray during landing and taxiing. The power plant or engine 14 for driving the propeller 13 is located within the fuselage 10. For example, it may be located adjacent to the center of gravity of the craft. It is to be observed that where the power-transmitting means of the invention is employed, the engine 14 may be mounted in a position remote from the propeller 13 to be advantageously located from the standpoint of aircraft design, servicing of the engine, etc.

Figure 2 illustrates a portion of an automobile or similar vehicle having a suitable frame 15, an engine 16 and driving wheels 17. The engine 16 is supported on the frame 15 to have the axis of its shaft in the central longitudinal plane of the vehicle. The engine shaft, not shown, extends to a differential 18 and horizontal shafts 19 extend outwardly through housings 20 projecting from the differential. The wheels 17 support the vehicle through independent suspension elements 21 which carry the housings 20 of the shafts 19. The elements 21 are swingably journaled on the housings 20 so that there may be relative movement between the frame 15 and the wheels 17 about the common axis of the shafts 19. The belt and pulley drives of the invention serve to operatively connect the shafts 19 and the wheels 17 and are such that they permit this relative movement.

Belt and pulley transmissions of the invention, suitable for use in the structures of Figures 1 and 2 and in numerous other situations, are described in detail below. These power-transmitting devices may be employed to operate superchargers, boundary layer controls, etc., of aircraft, and may be used to operatively connect aircraft engines with propellers mounted at various positions on aircraft. The power transmissions of the invention are also useful in stationary installations, in land vehicles and in marine installations. In the following detailed description where an engine or driving unit is referred to, it is to be understood as meaning any power source or driving unit and is not to be considered as meaning either the engine 14 or the engine 16 unless they are referred to specifically.

A typical embodiment of the invention may be said to comprise generally, pulleys P, a belt B operating over the pulleys, and means 23 for controlling the tension on the belt B to maintain the power-transmitting means in its most efficient state under the varying conditions of operation.

The pulleys P may be of any selected construction and material and of any required diameters. As shown in the typical applications of Figures 1 and 2, the pulleys P are fixed to shafts having spaced parallel axes and the pulleys are in alignment. In accordance with the invention, the pulleys P have cylindrical peripheral surfaces 24, that is, they have no crowns. In most installations it is preferred that the active pulley surfaces 24 be plain and devoid of friction material as will be more fully described. The pulleys P need be only slightly wider than the belt B and where the belt of the invention is characterized by its limited width with respect to the power transmitted it will be apparent that the pulleys may be relatively narrow. This is important where the weight of the pulleys and other parts must be kept at a minimum.

The belt B is an important element of the invention. The construction of the belt B may be varied considerably and I have illustrated several typical constructions of the invention. The belt B illustrated in detail in Figures 3, 4, and 5 of the drawings, comprises a body or ribbon 25 of metal and friction material 29 on the ribbon. In the form of the invention being described, there is a single uninterrupted metal ribbon 25 whose ends are connected to form a continuous loop. The belt body or ribbon 25 is formed of a material having a high tensile strength and substantial flexibility. In practice I prefer to construct the ribbon 25 of a high carbon steel having a tensile strength in the order of 300,000 pounds per square inch, stainless steel, beryllium copper, or the like. The dimensions of the ribbon 25, of course, vary in different applications of the invention, but I prefer to employ a ribbon between .002 and .020 inch thick. The width of the belt body or ribbon 25 is varied to give the ribbon the required cross sectional area for the particular installation. It is to be understood that the width and thickness of the ribbon 25 are uniform throughout the length of the belt. A belt body or ribbon 25 of the material above referred to may have an extremely small cross sectional area in relation to the power to be transmitted. For example, with a suitable ratio of pulley diameters the ribbon 25 may have a cross sectional area of .012 square inch where 300 horsepower is to be transmitted. The extreme thinness of the belt ribbon 25 reduces the bending stresses to a minimum. Where the thickness of the ribbon 25 is, say .006 inch, it will be seen that there are very low compression stresses and tensile stresses at opposite sides of the neutral layer of those portions of the belt operating over the pulleys. This feature coupled with the low weight of the belt body 25 allows the belt to operate at high peripheral speeds over pulleys of small and relatively small diameters.

The invention provides a very effective and dependable joint for connecting the ends of the metal ribbon 25. In making this joint the opposite end portions of the ribbon 25 are scarfed, that is, they are provided with surfaces 26 pitched longitudinally of the ribbon. As illustrated in detail in Figures 4 and 5, each end portion of the ribbon 25 has scarf surfaces 26 on its opposite sides pitched or sloped to converge toward the extremity of the ribbon. The surfaces 26 extend throughout the width of the ribbon and are of substantial length. It is preferred that the scarf surfaces 26 be flat and regular and of like uniform pitch. The scarf surfaces 26 may be formed in any selected manner. In practice I have found it desirable to etch the surfaces 26 by immersing the end portions of the ribbon 25 in an etching bath and slowly moving said end portions vertically into or out of the bath so that the surfaces 26 are given the required length and pitch. An etching bath suitable for this operation may contain 15 per cent by volume of nitric acid and 85 per cent by volume of ethyl alcohol or water. It is also contemplated that the scarf surfaces 26 may be honed on the ribbon. It is important, however, that the metal of the ribbon 25 is not subjected to high damaging temperatures during the formation of the surfaces 26 and for this reason the etching method above described is highly desirable. The longitudinal edges 27 of the ribbon 25 are outwardly or forwardly convergent throughout a portion of the scarfed parts by reason of the convergent surfaces 26 and if desired, these edges 27 and the end edges of the ribbon may be somewhat flattened to eliminate the sharp edges that would otherwise be present.

The complementary scarf surfaces on the opposite end portions of the ribbon 25 are connected or secured together to form a joint having a strength equal to or greater than the strength of the other parts of the belt. This connection is made without subjecting the metal of the body or ribbon 25 to damaging temperatures. A film or layer 28 of a suitable cement serves to bond or cement together the opposing complementary scarf surfaces 26. The layer 28 of cement is continuous throughout the extensive opposing surfaces 26 and is made as uniform as possible to provide a bond or connection of great strength. The cement may occupy the corner spaces occurring along the edges 27 and at the extremities of the scarfed parts. In making the joint, the cement is applied to the surfaces 26 and the scarfed parts are subjected to pressure and suitable heat to assure an effective connection. If desired, low temperature solder may be employed to connect the scarf surfaces 26, in which case the solder constitutes a uniform continuous layer similar to the layer of cement 28, and serves to provide a dependable connection. It is to be observed that in the two modes of making the connection just described, the metal of the body or ribbon 25 is not subject to excessive or damaging temperatures.

Where the end portions of the metal body or ribbon 25 have scarf faces 26 on both sides as in Figure 5, there is an off-set or slight staggering of the adjacent corresponding faces of the ribbon 25, but owing to the extreme thinness of the ribbon this off-set is negligible and has no undesirable results. Figure 6 of the drawings illustrates a connection of the invention in which there is a scarf surface 26a on one side only of each end portion of the belt body or ribbon 25. These scarf surfaces 26a are pitched to be complementary and are connected or bonded together by a layer 28a of cement or low temperature solder as in the previously described form of joint. In the joint of Figure 6 the surfaces of the belt body or ribbon 25 are maintained in common planes at the joint and there is no off-setting.

In most applications of the invention it is preferred to provide a material on the body or ribbon 25 to protect the surfaces of the ribbon against corrosion and abrasion, and to assure an effective power-transmitting contact of the belt with the pulleys P. In some instances the protective and friction material may be provided only on the inner or active face of the belt B, while in other cases the material is provided on both surfaces of the belt to fully protect the metal ribbon 25. Figures 3 and 9 show friction material 29 provided on both sides of the metal ribbon 25. The material 29 is employed in the form of strips or straps somewhat wider than the ribbon 25 to protrude beyond the longitudinal edges of the metal ribbon. The protruding portions of the material 29 are brought or pressed together so that the material completely encases the ribbon. The material 29 is preferably pressed ground cork of a selected thickness, although rubber, fabric, rubber and fabric combinations, etc., may be employed if desired. The friction material 29 is cemented to the faces of the ribbon 25 by a selected cement. The cement and the material 29, seal and protect the metal of the ribbon 25, saving it from abrasion and from corrosion. The friction material 29 is continuous throughout the length of the belt B and covers the joint as well as all other parts of the ribbon 25. The material 29 assures an effective frictional engagement between the belt B and the pulleys P. Where the material 29 is pressed ground cork, it is extremely light in weight and is substantially unaffected by oil, etc.

Figure 9 illustrates a pulley P having a plain, active surface 24 and shows a belt B provided with friction material 29 as described above for engaging on the pulley. Figure 10 illustrates a pulley P whose active surface is provided with friction material 30 such as ground cork, rubber, fabric, or combinations of such materials. Where the pulleys P are faced with the material 30 as in Figure 10, the belt B need not be provided with friction material and the metal ribbon 25 may engage directly on the pulleys. As a further protection for the belt B it is usually preferred to provide a housing around the belt and pulley combination. Thus as seen in Figure 2 of the drawings, the pulleys P are fixed to the ends of the shafts 19 and are associated with the wheels 17 and the belts B operating over these pulleys, are entirely housed or enclosed by suitable cases or housings 31.

Figure 7 illustrates a form of belt of the invention in which the belt body or metal ribbon 25$^b$ is given a special shape to increase its resiliency. The belt body or ribbon 25$^b$ is formed of thin steel or the like, as in the other embodiments of the invention, and is faced on its opposite sides with the friction material 29. In this construction the ribbon 25$^b$ is waved or provided with successive undulations or corrugations. The ribbon 25$^b$ is formed to have a continuous series of straight parallel regular or equal ridges and hollows extending transversely of its longitudinal axis. The long axes of the corrugations are preferably truly normal to the longitudinal axis of the belt. The depth and curvature of the corrugations may vary in different embodiments of the invention. The friction material 29 is cemented or otherwise secured to the broad faces of the ribbon 25$^b$ and is pressed to conform to the waves or corrugations so that its outer surfaces are substantially flat and smooth. When the belt operates over the pulleys P, the material 29 is compressed to a greater degree at the crests of the corrugations and, to a lesser degree, at the troughs, but this action is minor.

In the belt of the invention illustrated in the Figure 8 of the drawings, there are two or more superimposed metal ribbons 25$^c$. The individual ribbons 25$^c$ may be the same as the steel body or ribbon 25 described above. In the particular case illustrated, there are three metal ribbons 25$^c$ engaged one upon the other, it being understood that each ribbon 25$^c$ is an independent continuous length of metal whose opposite ends are connected by a joint such as illustrated in Figure 6. It is preferred to arrange the ribbons 25$^c$ so that their joints are off-set from one another, and in practice, the joints may be equally spaced throughout the length of the belt.

The means 23 is provided to control or vary the tension on the belt B in direct relation to the power being transmitted. The means 23 utilizes the torque reaction to control the tension on the belt B. In accordance with the invention, the automatic belt tensioning means may be associated either with the driving element or the driven element, and may be varied considerably in the different applications of the invention.

The automatic tensioning means assures optimum performance of the drive by eliminating, or reducing to a minimum, slippage between the belt and pulleys. The means 23 further insures that the belt stresses, bearing loads, etc., are maintained proportional to the power being transmitted, thus prolonging the life of the belt, bearings and other parts. Further, the automatic tensioning means is such that the torque or power can be transmitted in only one direction between the driving and driven elements. This prevents the generation of torsional vibrations between the driving and driven elements and makes the drive "free wheeling."

Figures 11 and 12 illustrate the automatic belt tensioning means 23 associated with the driving element. The driving element in this instance may be considered the engine 14 of Figure 1. The means 23 is in the nature of a suspension system for the power plant or engine 14. The means 23 includes a suitable frame having generally horizontal base members 35 spaced below the engine 14. Uprights 36 extend from the base members 35 at opposite ends of the engine. Brackets 37 project inwardly from the uprights 36 and lie close to the ends of the engine. The engine 14 is supported or suspended on the brackets 37 by pivot shafts or pins 38.

The engine supporting pins 38 lie in a common axis spaced from and parallel with the axis of the engine shaft 39. The axis of suspension of the engine 14, as provided by the pins 38, lies in a plane substantially normal to the plane which intersects the axes of rotation of the driving and driven elements or pulleys P. Thus in Figures 1, 11 and 12 where the driving and driven elements are spaced apart vertically, the suspension pins 38 have their common axis in the same horizontal plane as the axis of rotation of the drive pulley P. The angle between the medial plane of the belt and pulley drive and the plane occupied by the axis of suspension of the engine 14 is designated "X" in the drawing. The axis of suspension of the engine 14 is off-set from the axis of rotation of its pulley P in a direction toward the slack or incoming side of the belt B. Thus in Figure 12 it will be assumed that the pulley P of the engine 14 is rotating in a counter-clockwise direction as indicated by the arrow A and the axis 38 of suspension of the engine 14 is off-set to the left of the axis of rotation of the drive pulley P.

The location of the axis 38 of suspension of the engine 14, that is, the extent of off-setting of the axis 38 from the axis of rotation of the drive pulley P, depends upon such factors as the coefficient of friction of the materials comprising the contacting parts of the belt B and pulleys P, the peripheral extent of this contact, etc. When the driving pulley P is put into operation the torque reaction causes the entire driving unit constituting the engine 14 and its pulley P to move or turn about its axis 38 of suspension. The direction of this pivotal or turning movement is indicated by the arrow B$^1$ in Figure 12, assuming the direction of rotation of the drive pulley P to be counter-clockwise. This bodily turning movement of the driving unit about the axis 38 tightens or tensions the belt B as will be evident from an inspection of Figure 12. Assuming the operation to continue, the engine or driving unit soon stabilizes or settles down to deliver a given torque, which is dependent upon the resistance offered by the driven unit. This torque divided by the distance between the axis 38 of suspension and the axis of rotation of the drive pulley P, may, for the moment be considered as equally divided between the tight or incoming side of the belt B and the departing or slack side of the belt. However, because torque or power must be transmitted to the driven pulley, this equal division of the tension is instantly readjusted so that one side of the belt becomes tighter and the other side becomes looser. Where the axis 38 of suspension of the driving unit is properly located, the tensions on the tight and slack sides of the belt B bear the following relation:

$$\frac{T_1}{T_2} = < e^{ue}$$

where $T_1$ = the tension on the tight side of belt B.
$T_2$ = the tension on the slack side of the belt B.
$e$ = the base of natural logarithm.
$u$ = the co-efficient of friction between the belt B and driving pulley P.
$e$ = the angle of wrap of the belt B around the driving pulley P.

Where this condition obtains, the drive is positive. The co-efficient of friction represented by $u$ above, may be readily determined experimentally and the angle wrap of the belt B around the pulley P may be easily measured.

The torque reaction utilized to tension the belt B is proportional to the power output with the result that slippage of the belt is avoided and the stressing of the belt and the loading of the bearings are proportional to the output and are not excessive at low outputs as in the case of spring loaded belt tensioning means. Further, it will be apparent that the means 23 is such that the belt B is loosened to the extent that the drive is ineffective in the event of reverse rotation of the drive pulley, thus making the drive "one way" and "free wheeling." This feature also prevents the development of torsional vibration between the driving and driven elements, any tendency for such vibration to develop being effectively damped out by the "one way" action. The means 23 is extremely simple and light in weight and does not necessitate the use of pulleys or other elements for engaging and wearing the belt.

The means 23 may include a yielding movement resisting means associated with the bodily movable or turnable drive unit. This movement controlling means may take various forms. In the drawings it includes a cylinder 40 attached to a rod 41 which in turn is carried by the base members 35. A lever 42 projects from the engine 14 and a rod 43 is pivotally connected with the lever 42 to extend downwardly into the cylinder 40. A piston 44 on the rod 43 loosely fits the cylinder 40 and a compression spring 45 bears upwardly against the under side of the piston 44. It is believed that the movement controlling action of the spring loaded piston 44 operating in the cylinder 40 will be readily understood.

As above described, the thin steel belt B may be operated at extremely high linear velocities without excessive stress resulting from centrifugal force. Because of this inherent characteristic of the belt B it is possible to employ a driving pulley of larger diameter than the driven pulley to transmit substantial power, and then employ suitable means at the driven pulley to reduce the speed of the driven unit to the desired value. For example, if the driving pulley is one foot in diameter and is driven at 3000 R. P. M. to drive the driven pulley at 1500 R. P. M., the driven pulley will be two feet in diameter. For a given power transmitted, certain stresses will be impressed on the belt B. If in such a situation the drive pulley P is made two feet in diameter and the driven pulley is made one foot in diameter, the peripheral speed of the belt is doubled and the driving torque is also doubled. Thus substantially four times as much power may be transmitted with the same stresses in the belt B and the same loads on the bearings. However, the driven pulley P is being rotated at four times the required speed. An epicyclic gear mechanism may be employed to reduce the speed of the driven unit as required and the invention utilizes an element of this gear mechanism as an automatic belt tensioning element. An epicyclic gear train provides a torque reaction element suitable for the automatic tensioning of the belt.

In Figures 13 and 14, I have shown a form of automatic belt tensioning means for the invention operable to tension the belt in proportion to the torque, which means utilizes epicyclic gearing at the driven unit as the actuating means. The mechanism of Figures 13 and 14 includes two drive elements 50 in the form of pulleys and a driven element in the form of a shaft 51. The drive pulleys 50 may be fixed to individual engine shafts or other power source shafts. The drive pulleys 50 are spaced one above the other and their axes are parallel with the shaft 51. The drive elements or pulleys 50 occupy spaced adjacent vertical planes and preferably have cylindrical peripheral surfaces for cooperating with the belts B of the invention. Driven pulleys 52 surround the shaft 51 and are spaced apart to be in the same vertical planes as their related drive pulleys 50. As illustrated, the drive pulleys 50 may be larger in effective diameter than the driven pulleys 52 to obtain the power advantage I have described above. The belts B operate over the separate pairs of pulleys 50 and 52 and are entirely independent.

The driven pulleys 52 are operatively connected with the driven shaft 51 by speed reducing epicyclic gearing. The pulleys 52 have end flanges 53 provided with inturned hubs 54. See Figure 14. Each epicyclic gear means includes a sun gear 55 fixed to the hub 54 of its related driven pulley 52. Satellite pinions or gears 56 mesh with the sun gear 55. The satellite gears 56 are carried by spaced stub shafts 57 which in turn are supported by a carrier 58. The carrier 58 is keyed or otherwise fixed to the shaft 51. A bell 59 enters the open end of the driven pulley 52 and carries an internal gear 60. The satellite gears 56 mesh with the internal gear 60. The bell 59 has a hub 61 journaled or turnably supported on the shaft 51, a housing for the shaft or other suitable support. A lever arm 62 is fixed to the bell 59 and projects outwardly beyond the driven pulley 52. The two epicyclic gear trains for the driven pulleys 52 may be the same, and the above description is applicable to both.

The belt tensioning means includes an idler pulley 63 for cooperating with each belt B. The idler pulleys 63 preferably cooperate with the slack sides of the belts B and are preferably provided with flanges 64 to aid in guiding the belts. Bell cranks 65 support the shafts of the idler pulleys 63. The bell cranks 65 are pivotally mounted on suitable supports 66. Push rods or links 67 operatively connect the arms 62, associated with the epicyclic gear trains, with their related bell cranks 65. The links 67 are pivotally connected with the arms 62 and the short outer arms of the bell cranks 65.

Assuming the drive pulleys 50 to be in operation, the belts B serve to transmit the power from the drive pulleys to the driven pulleys 52. The epicyclic gear trains are such that the bells 59 constitute movable elements responsive to the torque reaction. The torque reaction produces movement of the bells 59 and this movement is transmitted to the idler pulleys 63 through the medium of the arms 62, the links 67 and bell cranks 65. The torque reaction is proportional to the torque being transmitted and the idler pulleys 63 are operated by the torque reaction responsive means to maintain the tension on the belts B proportional to the transmitted torque. When no torque is being transmitted there is little or no tension on the belts B and the driven unit is substantially free for independent movement or "free wheeling." If desired, torque indicating or measuring devices may be associated with the arms 62, links 67 or bell cranks 65 to be actuated thereby. It is to be understood that while I have shown two driving elements 50, the structure of Figures 13 and 14 may be utilized where one or any number of driving units are present.

Figure 15 illustrates still another form of automatic belt tensioning means that may be associated with the driven unit. In this structure there is a driven shaft 70 extending through a tubular housing 71. Suitable bearings 72 support the shaft 70 in the housing 71 for free rotation with respect thereto. The housing 71 is supported for limited turning movement about an axis of suspension spaced from and parallel with the axis of the shaft 70. In the case illustrated, spaced yokes 73 are fixed to the housing 71 and tongues 74 mounted on a stationary support engage in the yokes 73 and are connected therewith by pivot pins 75 to support the housing 71 for limited turning or pivotal movement.

The shaft 70 projects beyond the end of the housing 71 and the driven pulley 76 surrounds the projecting end of the shaft. The pulley 76 has an end flange 77 provided with an inturned hub 78 freely surrounding the shaft 70. A sun gear 79 is fixed to the hub 78. A carrier 80 is keyed or otherwise fixed to the shaft 70 and supports circumferentially spaced axial stub shafts 81. Satellite gears 82 are carried by the shafts 81 to mesh with the sun gear 79. A bell 83 is fixed to the housing 71 and carries an internal gear 84 which meshes with the satellite gears 82. The internal gear 84 is fixed to the bell 83 and forms the relatively stationary but torque reaction responsive element of the epicyclic gear train. The internal gear 84 and the bell 83 are fixed to the housing 71 so that the housing is movable by or responsive to the torque reaction. It will be seen that the torque reaction tends to cause the housing 71 to move or turn about its axis or suspension. With a proper location of the axis of suspension, this movement tensions the belt so that the tension on the belt is always proportional to the torque being transmitted. When no torque is being transmitted the belt is substantially untensioned and the shaft 70, or driven element, is freed for independent rotation or "free wheeling." The automatic belt tensioning means of Figure 15 is well suited for use where the drive pulley is larger in diameter than the driven pulley and it is desired to reduce the speed of rotation of the driven unit at the driven pulley.

Having described only typical forms of the invention, I do not wish to be limited to the specific details herein set forth, but wish to reserve to myself any variations or modifications that may appear to those skilled in the art or fall within the scope of the following claims.

I claim:

1. In a power transmission, a belt comprising a thin metal strip whose end portions are scarfed to have extensive complementary scarf faces and cement joining said faces so that the strip forms a continuous belt of substantially uniform thickness, flexibility and strength throughout.

2. A high speed power transmitting belt comprising a strip of metal of high tensile strength between .002 and .020 inch thick, the end portions of the strip presenting scarfed surfaces, cement joining said surfaces so that said strip forms an endless belt body of substantially uniform thickness throughout, and protective facing material on the strip.

3. A power transmitting belt comprising a thin ribbon of high tensile strength metal, a scarfed cemented joint directly connecting the ends of the ribbon whereby the ribbon forms a continuous power transmitting unit of substantially uniform thickness throughout, and layers of resilient friction material cemented on the opposite faces of the ribbon and having portions protruding beyond the opposite edges of the ribbon, said portions being in engagement so that the layers completely encase the ribbon, said layers transmitting practically no power during belt operation.

JOHN J. BLOOMFIELD.

REFERENCES CITED

The following references are of record in the file of this patent:

UNITED STATES PATENTS

| Number | Name | Date |
|---|---|---|
| 1,309,245 | Coryell | July 8, 1919 |
| 1,404,848 | Gusdorf | Jan. 31, 1922 |
| 2,321,580 | Conradson | June 15, 1943 |
| 1,321,686 | Varden | Nov. 11, 1919 |
| 2,309,305 | Dahlstrom | Jan. 26, 1943 |
| 1,242,166 | Fitzgeral | Oct. 9, 1917 |
| 2,108,368 | Christian | Feb. 15, 1938 |
| 1,555,840 | Hanley | Oct. 6, 1925 |
| 2,130,753 | Baker | Sept. 20, 1938 |
| 24,243 | Smith | May 31, 1859 |
| 757,919 | Harley | Apr. 19, 1904 |
| 492,880 | Todd | Mar. 7, 1893 |
| 1,341,470 | Kinnaird | May 20, 1920 |
| 2,300,706 | Schott | Nov. 3, 1942 |

FOREIGN PATENTS

| Number | Country | Date |
|---|---|---|
| 5,980 | Great Britain | Apr. 21, 1915 |
| 28,777 | Switzerland | Aug. 15, 1903 |

OTHER REFERENCES

Welding Encyclopedia (9th edition), page 82.